US009009714B2

(12) United States Patent
Lee et al.

(10) Patent No.: US 9,009,714 B2
(45) Date of Patent: Apr. 14, 2015

(54) METHOD, MEDIUM AND APPARATUS SCHEDULING TASKS IN A REAL TIME OPERATING SYSTEM

(75) Inventors: Jae-don Lee, Paju-si (KR); Seung-won Lee, Hwaseong-si (KR); Jeong-joon Yoo, Yongin-si (KR); Young-sam Shin, Yongin-si (KR); Min-kyu Jeong, Seoul (KR); Keun-soo Yim, Yongin-si (KR)

(73) Assignee: Samsung Electonics Co., Ltd., Suwon-si (KR)

( * ) Notice: Subject to any disclaimer, the term of this patent is extended or adjusted under 35 U.S.C. 154(b) by 1410 days.

(21) Appl. No.: 12/002,758

(22) Filed: Dec. 19, 2007

(65) Prior Publication Data

US 2008/0168455 A1    Jul. 10, 2008

(30) Foreign Application Priority Data

Jan. 5, 2007   (KR) .......................... 10-2007-0001701

(51) Int. Cl.
 *G06F 9/46* (2006.01)
 *G06F 9/48* (2006.01)
(52) U.S. Cl.
 CPC ..................... *G06F 9/4887* (2013.01)
(58) Field of Classification Search
 None
 See application file for complete search history.

(56) References Cited

U.S. PATENT DOCUMENTS

| 5,640,563 | A | * | 6/1997 | Carmon | ......................... | 718/102 |
| 6,813,766 | B2 | | 11/2004 | Hay | | |
| 2003/0078954 | A1 | * | 4/2003 | Haughey | ....................... | 709/102 |
| 2005/0015767 | A1 | * | 1/2005 | Nash et al. | .................... | 718/102 |
| 2005/0149938 | A1 | * | 7/2005 | Choi | ............................. | 718/102 |

FOREIGN PATENT DOCUMENTS

| JP | 2000-322278 | 11/2000 |
| JP | 2005-71161 | 3/2005 |

OTHER PUBLICATIONS

Chinese Office Action for corresponding Chinese Patent Application No. 200810001504 dated Nov. 9, 2011.

* cited by examiner

*Primary Examiner* — Emerson Puente
*Assistant Examiner* — Sisley Kim
(74) *Attorney, Agent, or Firm* — NSIP Law

(57) ABSTRACT

A scheduling method, medium and apparatus are provided. In the scheduling method, medium and apparatus, it is possible to prevent the possibility that the order between the priorities of the tasks represented by the expired timers and the tasks requested by the interrupt is reversed while also not deteriorating the performance of a real time operating system (RTOS), even though the number of timers expired when the interrupt occurs or that are already expired before the interrupt occurs is large, by selecting a timer for representing a point of time corresponding to a point of time when an interrupt occurs from among one or more timers each of which representing a task, a point of time assigned to the tasks, and a priority assigned to the task and executing a task represented by the selected timer and one or more tasks requested by the interrupt in order of priority.

7 Claims, 2 Drawing Sheets

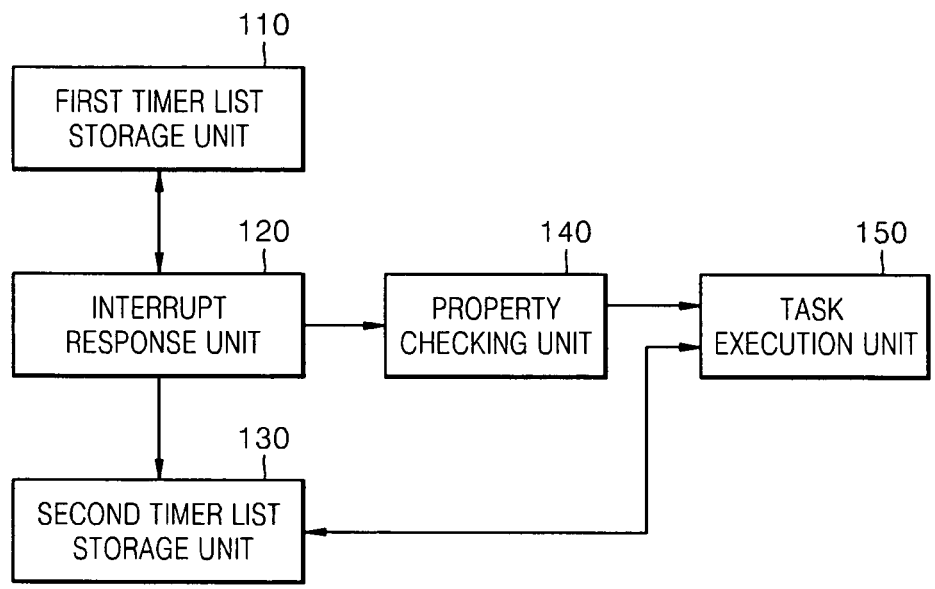

METHOD, MEDIUM AND APPARATUS SCHEDULING TASKS IN A REAL TIME OPERATING SYSTEM

CROSS-REFERENCE TO RELATED APPLICATIONS

This application claims the benefit of Korean Patent Application No. 10-2007-0001701, filed on Jan. 5, 2007, in the Korean Intellectual Property Office, the disclosure of which is incorporated herein in its entirety by reference.

BACKGROUND

1. Field

One or more embodiments of the present invention relate to scheduling, and more particularly, to a scheduling method, medium and apparatus for a real time operating system (RTOS) such as MicroC/OS-II.

2. Description of the Related Art

A real time operating system (RTOS) uses resources of a computing device in which the RTOS is mounted and adjusts an execution order of tasks based on the respective priorities of the tasks. That is, the RTOS performs scheduling of a plurality of tasks to be executed.

A scheduling apparatus performs scheduling of tasks prepared according to points of time and one or more tasks requested by an interrupt, and executes the tasks. Specifically, the scheduling apparatus executes the tasks requested by the interrupt after one or more timers expire when the interrupt occurs, from among timers which represent the tasks prepared according to points of time.

Accordingly, in such a conventional scheduling apparatus, as the number of expired timers increases, starting execution of the tasks requested by the interrupt is delayed. Therefore, the performance of the RTOS deteriorates. In addition, although there may be a task having a higher priority than that of the task represented by the expired timer, from among the tasks requested by the interrupt, the existing scheduling apparatus executes the tasks represented by the expired timer first and then executes the tasks requested by the interrupt. Accordingly, the previously determined priorities of the tasks may be unintentionally changed.

SUMMARY

One or more embodiments of the present invention provide a scheduling method of executing tasks while preventing the order between task priorities from being reversed, such as priorities represented by expired timers and tasks requested by the interrupt. In addition, the method does not deteriorate the performance of a real time operating system (RTOS), even though the number of timers expired at the moment the interrupt occurs, or that are already expired before the interrupt occurs, is large.

One or more embodiments of the present invention provide a scheduling apparatus executing tasks while preventing the order between tasks priorities from being reversed, such as priorities represented by the expired timers and the tasks requested by the interrupt. In addition, the method does not deteriorate the performance of a RTOS, even though the number of timers expired at the moment the interrupt occurs, or that are already expired before the interrupt occurs, is large.

One or more embodiments of the present invention provide a computer-readable recording medium having embodied thereon a computer program capable of executing tasks while preventing the possibility that the order between the priorities of the tasks represented by the expired timers and the tasks requested by the interrupt is reversed and while not deteriorating the performance of a RTOS, even though the number of timers expired when the interrupt occurs or that are already expired before the interrupt occurs is large.

Additional aspects and/or advantages will be set forth in part in the description which follows and, in part, will be apparent from the description, or may be learned by practice of the invention.

To achieve at least the above and/or other aspects and advantages, embodiments of the present invention include a scheduling method. The method includes selecting a timer from among one or more timers, the timer being selected to represent a point of time corresponding to a point of time when an interrupt occurs, wherein each of the one or more timers represents a task, a point of time assigned to the tasks, and a priority assigned to the task, and executing a task represented by the selected timer and one or more tasks requested by the interrupt in order of priority.

To achieve at least the above and/or other aspects and advantages, embodiments of the present invention include a scheduling apparatus. The apparatus includes an interrupt response unit selecting a timer from among one or more timers, the timer being selected to represent a point of time corresponding to a point of time when an interrupt occurs, wherein each of the one or more timers represents a task, a point of time assigned to the task and a priority assigned to the task and a task execution unit executing a task represented by the selected timer and one or more tasks requested by the interrupt in order of priority.

To achieve at least the above and/or other aspects and advantages, embodiments of the present invention include at least one medium comprising computer readable code to control at least one processing element in a computer to implement the method of claim 1.

BRIEF DESCRIPTION OF THE DRAWINGS

These and/or other aspects and advantages will become apparent and more readily appreciated from the following description of the embodiments, taken in conjunction with the accompanying drawings of which:

FIG. 1 illustrates a scheduling apparatus, according to an embodiment of the present invention;

FIG. 2 illustrates a scheduling mechanism, according to an embodiment of the present invention.

DETAILED DESCRIPTION OF EMBODIMENTS

Figure 3:
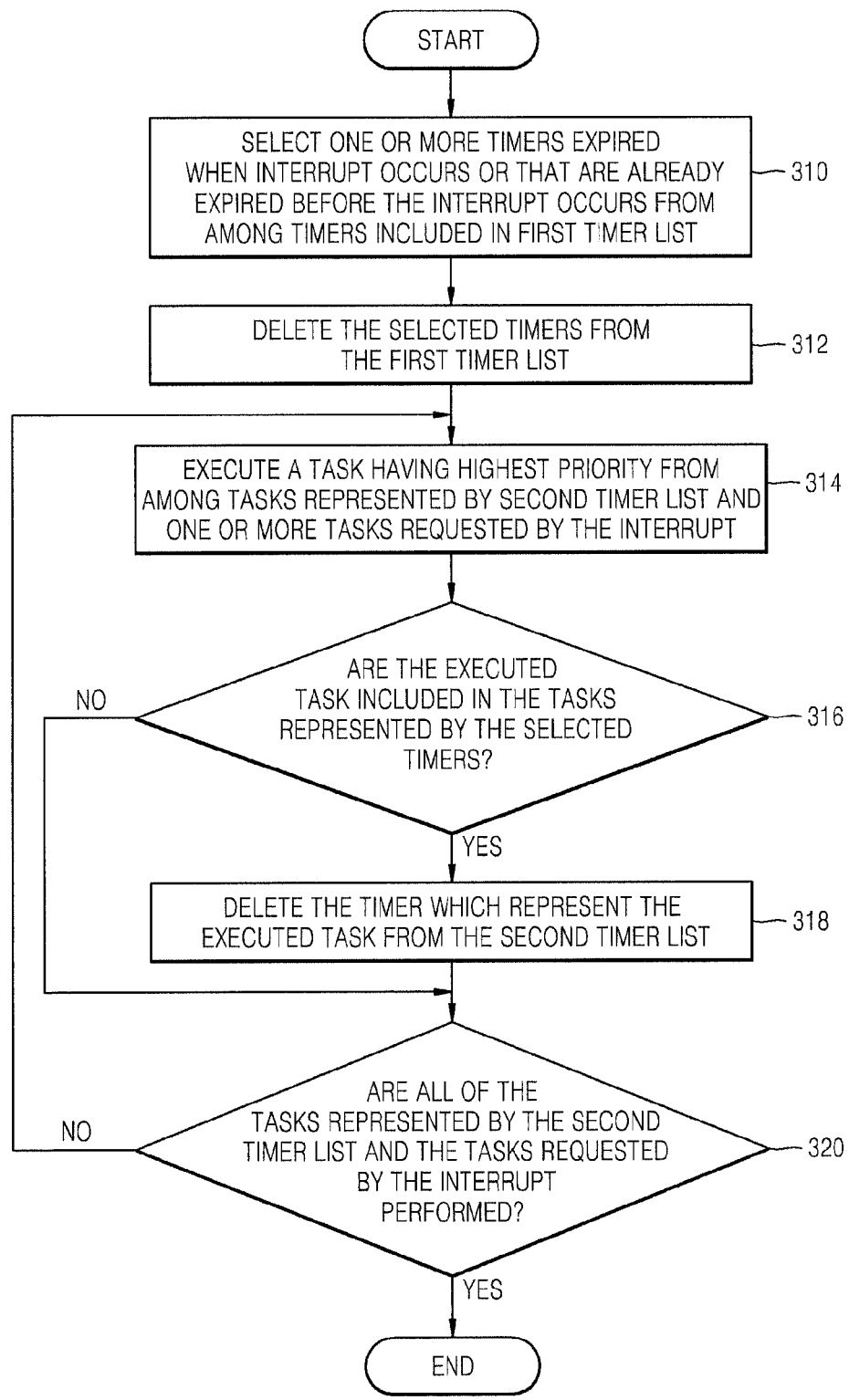
FIG. 3 illustrates a scheduling method, according to an embodiment of the present invention.

Reference will now be made in detail to embodiments, examples of which are illustrated in the accompanying drawings, wherein like reference numerals refer to the like elements throughout. Embodiments are described below to explain the present invention by referring to the figures.

FIG. 1 illustrates a scheduling apparatus according to an embodiment of the present invention. The scheduling apparatus may include, for example, a first timer list storage unit 110, an interrupt response unit 120, a second timer list storage unit 130, a property checking unit 140, and a task execution unit 150. The first timer list storage unit 110, the interrupt response unit 120, the second timer list storage unit 130, the property checking unit 140, and the task execution unit 150 may be embodied, for example, in a real time operating system (RTOS). Although a scheduling operation among operations of the task execution unit 150 to be described may be executed in the RTOS, the task may equally be executed in resources of a computing device on which the RTOS is loaded, for example.

A point of time and a priority may be assigned to each task executed by the scheduling apparatus. Generally, a timer denotes information including information on a point of time assigned to the task and information on a priority assigned to the task. The timer may include information on whether properties of the timer are hard or soft. Hard properties of the timer represent that the task represented in the timer generally cannot be executed after a predetermined deadline. That is, when the task represented in the hard timer is executed after the deadline, the task is generally considered to be invalid. On the other hand, soft properties of the timer represent that the task in the timer generally can be executed after a predetermined deadline. That is, when the task represented in the soft timer is executed after the deadline, the task is generally considered to be valid. However, as a difference between the execution time and the deadline increases, the validity may decrease. When the difference exceeds a threshold amount of time, the execution of the task is considered to be invalid.

A plurality of timers may be previously prepared in an RTOS. A clock included in a computing device in which the RTOS is installed may represent a current time. One or more expired timers from among the previously prepared timers may be gathered so as to construct a list. Hereinafter, the list is referred to as a first timer list. An expired timer indicates a timer in which a current time is either at, or past, the point of time assigned to the timer. The timers in the first timer list may be aligned in the order of points of time assigned to the timers. On the other hand, a plurality of timers to which the same point of time has been assigned may be aligned in the order of properties or priorities.

The first timer list storage unit 110 may store the first timer list. The number of expired timers typically increases as the current time increases (i.e., as time elapses). Accordingly, the first timer list stored in the first timer list storage unit 110 is usually continuously updated while the current time increases.

The interrupt response unit 120 operates in response to an occurrence of the interrupt. In an embodiment of the present invention, the interrupt may be a time-tick interrupt, for example. Specifically, in an embodiment of the present invention, the interrupt may periodically occur every predetermined time period.

When the interrupt occurs, the interrupt response unit 120 may select one or more timers which expire when the interrupt occurs or that are already expired before the interrupt occurs. The selected timers may be deleted from the first timer list. Accordingly, the first timer list stored in the first timer list storage unit 110 may be updated.

The timers selected by the interrupt response unit 120 may be gathered so as to construct a list. Hereinafter, the list is referred to as a second timer list. The timers in the second timer list may be aligned in order of priority. The second timer list storage unit 130 may be used to store the second timer list.

The property checking unit 140 may analyze properties of the timers which constitute the second timer list. Specifically, the property checking unit 140 may check whether the properties of the timers making up the second timer list are hard or soft.

The task execution unit 150 may schedule one or more tasks in the second timer list and one or more tasks that are requested, by the interrupt, to be performed, and may execute the tasks. In an embodiment of the present invention, the priorities are assigned to the tasks represented by the timers. Similarly, priorities may also be assigned to the tasks requested by the interrupt.

Specifically, the task execution unit 150 may schedule the tasks in consideration of priorities represented by the hard timers from among the timers which constitute the second timer list. Accordingly, the task execution unit 150 may execute the tasks represented by the hard timers from among the timers which constitute the second timer list, in order of priority.

The task execution unit 150 may schedule the tasks in consideration of priorities represented by the soft timers from among the timers which constitute the second timer list and one or more tasks requested by the interrupt. Accordingly, the task execution unit 150 may execute the tasks represented by the soft timers and one or more tasks requested by the interrupt in order of priority from among the timers which constitute the second timer list. More specifically, the task execution unit 10 may execute the task having the highest priority from among non-executed tasks represented in the second timer list, and one or more non-executed tasks from among one or more tasks requested by the interrupt in order of priority. When the task having the highest priority is executed, the executed task may then be deleted from the second timer list. Accordingly, the second timer list stored in the second timer list storage unit 130 may be updated whenever the task having the highest priority has been executed.

When the properties of all the timers which constitute the second timer list are hard, the task execution unit 150 may execute the tasks represented in the second timer list in order of priority. Alternatively, when the properties of all the timers which constitute the second timer list are soft, the task execution unit 150 may execute the tasks represented in the second timer list, and one or more tasks requested by the interrupt, in order of priority.

FIG. 2 illustrates a scheduling mechanism, according to an embodiment of the present invention. In FIG. 2, "Task" indicates a task, "Time" indicates a point of time assigned to tasks, and a number in parenthesis indicates a priority. For convenience of description, it may be assumed that properties of all the timers for representing tasks Tc, Tb, Te, Td, Ta, and Th are soft, an interrupt occurs at 3*N [ms] (where N is a natural number), an interrupt that occurs at a current time of 3 ms requests tasks Tf and Tg to be executed, and an interrupt that occurs at a current time of 6 ms requests tasks Ta and Th to be executed. Hereinafter, FIG. 2 is explained based on the description of FIG. 1.

When the current time is 1 ms, expired tasks include Tc and Ti. When the current time is 2 ms, expired tasks include Tc, Ti, and Tb. When the current time is 3 ms, expired tasks include Tc, Ti, Tb, and Te. When the current time is 4 ms, expired tasks include Tc, Ti, Tb, Te, and Tj. When the current time is 5 ms, expired tasks include Tc, Ti, Tb, Te, Tj, and Td. When the current time is 6 ms, expired tasks include Tc, Ti, Tb, Te, Tj, Td, and Ta. Accordingly, the first timer list may be updated as the current time increases (i.e., as time elapses).

As described above, when the current time is 4 ms, the first timer list includes a timer for representing that a task is Tc, a point of time is 1 ms, and a priority is 12, a timer for representing that a task is Ti, a point of time is 1 ms, and a priority is 10, a timer for representing that a task is Tb, a point of time is 2 ms, and a priority is 4, a timer for representing that a task is Te, a point of time is 3 ms, and a priority is 8, and a timer for representing that a task is Tj, a point of time is 4 ms, and a priority is 2. At this time, the timers may be aligned in order of points of time, e.g., chronologically, in the first timer list. However, the timers to which the same point of time is assigned may then be aligned in order of priority. That is, the timers may be aligned in the order of the timer for representing that the task is Ti, the point of time is 1 ms, and the priority is 10, the timer for representing that the task is Tc, the point of time is 1 ms, and the priority is 12, the timer for representing that the task is Tb, the point of time is 2 ms, and the priority is 4, the timer for representing that that the task is Te, the point of time is 3 ms, and the priority is 8, and the timer for representing that the task is Tj, the point of time is 4 ms, and the priority is 2.

On the other hand, a starting point of time of an operation of the interrupt response unit 120 may be a point of time when some time has elapsed after an interrupt occurs. For example, when an interrupt occurs at a current time of 3 ms, the interrupt response unit 120 may start to operate at a current time of 4 ms. At this time, the interrupt response unit 120 selects the timer for representing that the task is Tc, the point of time is 1 ms, and the priority is 12, the timer for representing that the task is Ti, the point of time is 1 ms, and the priority is 10, the timer for representing that the task is Tb, the point of time is 2 ms, and the priority is 4, and the timer for representing that the task is Te, the point of time is 3 ms, and the priority is 8, the timers being only those that expire when the interrupt occurs or that are already expired before the interrupt occurs among the timers included in the first timer list. Accordingly, the timer for representing that the task is Tc, the point of time is 1 ms, and the priority is 12, the timer for representing that the task is Ti, the point of time is 1 ms, and the priority is 10, the timer for representing that the task is Tb, the point of time is 2 ms, and the priority is 4, and the timer for representing that the task is Te, the point of time 3 ms, and the priority is 8 may be deleted from the first timer list and included in the second timer list. At this time, the timers may be aligned in order of priority in the second timer list. That is, the timers may be aligned in the order of the timer for representing that the task is Tb, the point of time is 2 ms, the priority is 4, the timer for representing that the task is Te, the point of time is 3 ms, and the priority is 8, the timer for representing that the task is Ti, the point of time is 1 ms, and the priority is 10, and the timer for representing that the task is Tc, the point of time is 1 ms, and the priority is 12, in the second timer list.

In this case, the task execution unit 150 may execute the task Tf having the highest priority between the task Tb having the highest priority among the tasks Tb, Te, Ti, and Tc represented in the second timer list and the non-executed tasks Tf and Tg included in the tasks Tf and Tg requested by the interrupt.

The task execution unit 150 may execute the task Tb having the highest priority between the task Tb' having the highest priority among the tasks Tb, Te, Ti, and Tc in the second timer list and the non-executed task Tg' included in the tasks Tf and Tg requested by the interrupt. Accordingly, the timer for representing that the task is Tb, the point of time is 2 ms, and the priority is 4 may be deleted from the second timer list.

The task execution unit 150 may execute the task having the highest priority Te between the task Te' having the highest priority among the tasks Te, Ti, and Tc in the second timer list and the non-executed task Tg' between the tasks Tf and Tg requested by the interrupt. Accordingly, the timer for representing that the task is Te, the point of time is 3 ms, and the priority is 8 may be deleted from the second timer list.

The timer execution unit 150 may execute the task Tg having the highest priority between the task Ti' having the highest priority among the tasks Ti and Tc in the second timer list and the non-executed task Tg' included in the tasks Tf and Tg requested by the interrupt.

The task execution unit 150 may execute the task Ti having the highest priority between the tasks Ti and Tc in the second timer list. Accordingly, the timer for representing that the task is Ti, the point of time is 1 ms, and the priority is 10 is deleted from the second timer list.

The task execution unit 150 may execute the task Tc represented in the second timer list.

As described above, the task execution unit 150 may execute the tasks Ti, Td, and Ta represented in the second timer list including the timer for representing that the task is Tj, the point of time is 4 ms, and the priority is 2, the timer for representing that the task is Td, the point of time is 5 ms, the priority is 6, and the timer for representing that the task is Ta, the point of time is 6 ms, and the priority is 3, and the task Th requested by the interrupt, in order of priority. That is, the task execution unit 150 may execute the tasks Tj, Td, Ta, and Th in the order of the tasks Th, Tj, Ta, and Td.

FIG. 3 illustrates a scheduling method, according to an embodiment of the present invention. The scheduling method may include operations 310 through 320, for example. The scheduling method may execute tasks while minimizing the possibility that the order between the priorities of the tasks, represented by the expired timers and the tasks requested by the interrupt, is reversed. At the same time, the scheduling method need not deteriorate the performance of the RTOS, even though the number of timers expired when the interrupt occurs or that are already expired before the interrupt occurs is large.

In operation 310, one or more timers that expired when the interrupt occurs or that are already expired before the interrupt occurs may be selected from among the timers included in a first timer list, e.g., by the interrupt response unit 120. Hereinafter, for convenience of description, it may be assumed that properties of all timers selected in operation 310 are soft.

In operation 312, the timers selected in operation 310 may be deleted from the first timer list, e.g., by the first timer list update unit (not shown). The first timer list update unit may be included in the scheduling apparatus, according to an embodiment of the present invention.

In operation 314, a task having the highest priority from among the tasks represented by a second timer list and one or more tasks requested by the interrupt may be executed, e.g., by the task execution unit 150. At this time, the second timer list may include the timers selected in operation 310.

In operation 316, it may be determined whether the tasks executed in operation 314 are included in the tasks represented by the timers selected in operation 310, e.g., by the second timer list update unit (not shown). The second timer list update unit may be prepared in the scheduling apparatus, according to an embodiment of the present invention.

In operation 318 the second timer list update unit may delete the timers which represent the tasks executed in operation 314 from the second timer list, when it is determined in operation 316 that the tasks executed in operation 314 are included in the tasks represented by the timers selected in operation 310.

In operation 320, it may be determined whether all of the tasks represented by the second timer list and the tasks requested by the interrupt are executed, e.g., by the task execution unit 150.

When it is determined in operation 320 that non-executed tasks, from among the tasks represented by the second timer list and the tasks requested by the interrupt, exist, the method may return to operation 314.

On the other hand, when it is determined in operation 316 that the tasks executed in operation 314 are not included in the tasks represented by the timers selected in operation 310, the method may proceed to operation 320.

As described above, in the scheduling method, medium and apparatus according to one or more embodiments of the present invention, when the properties of one or more timers that expire when the interrupt occurs or that are already expired before the interrupt occurs are soft, rather than hard, the tasks requested by the interrupt are not scheduled after the tasks represented by the expired timers are scheduled. The tasks represented by the expired timers and the tasks requested by the interrupt are scheduled by concurrently considering the priorities of the tasks represented by the expired timers and the priorities of the tasks requested by the interrupt. Accordingly, since the tasks requested by the interrupt rapidly start to be executed even though the number of expired tasks is large, the performance of the RTOS need not deteriorate.

In the scheduling method, medium and apparatus, according to one or more embodiments of the present invention, tasks represented by expired timers and tasks requested by an interrupt may be scheduled by concurrently considering the priorities of the tasks represented by the expired timers and the interrupt. Accordingly, a situation where an expired task is executed prior to a task requested by the interrupt may be prevented.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as media carrying or including carrier waves, as well as elements of the Internet, for example. Thus, the medium may be such a defined and measurable structure including or carrying a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A scheduling method, comprising:
   in response to an occurrence of an interrupt periodically at every predetermined period,
   selecting one or more timers from among timers which expire at a point in time when an interrupt occurs or are already expired before the interrupt occurs, wherein each of the one or more timers represents a task, a point of time assigned to the task, a priority assigned to the task and whether a property thereof is hard or soft;
   determining whether the property of the selected timer is hard or soft, wherein the hard property represents that the task is non-executable or invalid after a deadline has elapsed, and the soft property represents that the task is executable and valid after the deadline has elapsed; and
   executing a task represented by the hard timer prior to a task represented by the soft timer and prior to a task requested by the interrupt when it is determined that the property of the selected timer is hard, and, executing the task represented by the soft timer and the task requested by the interrupt in a priority order when it is determined that the property of the selected timer is soft, and proceeding to a selecting of the task having a highest priority until all tasks represented by the hard timer are executed.

2. The scheduling method of claim 1, wherein the executing of the task comprises:
   selecting a task having a highest priority from among non-executed tasks represented by hard timers;
   executing the task having the highest priority; and
   proceeding to the selecting of the task having the highest priority until all tasks represented by the hard timers are executed.

3. The scheduling method of claim 1, wherein the executing of the task further comprises:
   selecting a task having a highest priority from among non-executed tasks represented by the soft timers or the interrupt;
   executing the task having the highest priority; and
   proceeding to the selecting of the task having the highest priority until all the tasks represented by the soft timers or interrupt are executed.

4. A non-transitory computer readable recording medium having embodied thereon a computer program for executing the method according to claim 1.

5. A scheduling apparatus comprising:
   in response to an occurrence of an interrupt periodically at every predetermined period by the scheduling apparatus,
   an interrupt response unit selecting one or more timers from among timers which expire at a point of time when an interrupt occurs or are already expired before the interrupt occurs, wherein each of the one or more timers represents a task, a point of time assigned to the task and a priority assigned to the task and whether a property thereof is hard or soft;
   a property checking unit to determine whether the property of the selected timer is hard or soft, wherein the hard property represents that the task is non-executable or invalid after a deadline has elapsed, and the soft property represents that the task is executable and valid after the deadline has elapsed; and
   a task execution unit executing a task represented by the hard timer prior to a task represented by the soft timer and prior to a task requested by the interrupt when the property checking unit determines that the property of the selected timer is hard, and, executing the task represented by the soft timer and the task requested by the interrupt in a priority order when the property checking unit determines that the property of the selected timer is soft, and proceeding to a selecting of the task having a highest priority until all tasks represented by the hard timer are executed.

6. The scheduling apparatus of claim 5, wherein the task execution unit executes a task having a highest priority from among one or more non-executed tasks represented by hard timers until all the tasks represented by the hard timers are executed.

7. The scheduling apparatus of claim 5, wherein the task execution unit executes a task having a highest priority from among one or more non-executed tasks represented by soft timers and the interrupt until all the tasks represented by the soft timers and the interrupt are executed.

* * * * *